United States Patent [19]
Tanaka et al.

[11] Patent Number: 6,151,135
[45] Date of Patent: Nov. 21, 2000

[54] METHOD AND APPARATUS FOR COLOR REPRODUCTION

[75] Inventors: Kenji Tanaka, Kitasoma-Gun; Asako Kato, Sagamihara; Hideki Yamanaka; Naoki Nishiyama, both of Yokohama, all of Japan

[73] Assignee: Victor Company of Japan, Ltd., Yokohama, Japan

[21] Appl. No.: 09/044,036

[22] Filed: Mar. 19, 1998

[30] Foreign Application Priority Data

Mar. 19, 1997 [JP] Japan .................................. 9-065926
Mar. 26, 1997 [JP] Japan .................................. 9-073920

[51] Int. Cl.[7] .............................. G03F 3/08; B41B 15/00
[52] U.S. Cl. ........................... 358/1.9; 358/518; 358/523
[58] Field of Search ........................ 358/1.9, 523, 540, 358/518, 520; 382/162, 167

[56] References Cited

U.S. PATENT DOCUMENTS 5,264,927  11/1993  Miyoshi et al. ...................... 358/527
5,801,855  9/1998   Ohta ..................................... 358/518
5,933,252  8/1999   Emori et al. ......................... 358/500
5,978,107  11/1999  Murai et al. ......................... 358/520

FOREIGN PATENT DOCUMENTS 3-244292  10/1991  Japan .
7-222197  8/1995   Japan .

*Primary Examiner*—Kimberly A. Williams
*Attorney, Agent, or Firm*—Jacobson, Price, Holman & Stern, PLLC

[57] ABSTRACT

A first image is formed with at least a first color included in a first coloring system and corresponding to first color signal data converted from second signal data corresponding to at least a second color included in a second coloring system and related to an original image. At least a color modification parameter corresponding to a difference between the first color and a third color related to the original image. The color modification parameter is optimized to calculate a first area to be modified and a first amount to be modified with respect to the original image. A second image is formed using the second color signal data on the basis of the first area and amount to be modified and another first image already formed. Next, a third image is formed using the first color signal data, the third image corresponding to the second color. And, the second and third images are synthesized to form the first image.

11 Claims, 13 Drawing Sheets

METHOD AND APPARATUS FOR COLOR REPRODUCTION

BACKGROUND OF THE INVENTION

The present invention relates to color reproduction in a digital color image conversion system.

There is a strong demand for high quality in digital color image from high to low ends due to tremendous price down of computers and peripheral equipment.

In a color printing system, color image data composed of three-dimensional color signals supplied to a personal computer from a color image scanner is displayed on a color monitor and also printed by a color printer.

It is required that the original color image be reproduced in high quality on both a displayed color image and a printed color image. However, since the monitor and the printer have different color reproduction characteristics, the displayed and printed color images would be produced with different color if the color image supplied to the monitor were supplied to the printer with no particular color processing.

International Color Consortium (ICC) profile has been adopted to avoid this problem. The profile has files in which color reproduction characteristics for each device such as a color monitor and a color printer. Using the profile, a personal computer accepts color reproduction characteristics for the devices to reproduce the same color image on the monitor and printer, but still incomplete.

In a system with the ICC profile, an image data as RGB color signal data composed of red, green and blue is supplied to a personal computer. The personal computer takes addresses used for converting the RGB color signal data, with a color conversion table, into CMY color signal data composed of cyan, magenta and yellow to be printed on a color printer. The upper four bits of eight bits of the address.

The RGB color signal data are converted into main data of the CMY color signal data with the addresses on the color conversion table.

Interpolation coefficients are next obtained to generate interpolation data by an interpolation calculation such as eight-point interpolation using the interpolation coefficients and the lower four bits of the RGB color signal data. The interpolation data and the main data are synthesized to generate image data as the CMY color signal data. Here, the eight-point interpolation is to obtain a color on color space by interpolation using colors on eight points around a point on which the color to be obtained is located.

The data on the color conversion table and the interpolation coefficients are stored in a memory of the printer.

Through the color conversion explained above, the color reproductivity of the color monitor supplied the RGB color signal data and that of the color printer supplied the CMY color signal data are optimized.

In another method with the ICC profile, a personal computer first accepts image data A as color signal data corresponding to colors included in a first coloring system. Addresses on a color conversion table are taken under the same way as described above. Color conversion data are then taken using the address on the color conversion table.

Color conversion data interpolation is conducted to generate interpolation data. The interpolation data and the color conversion data are synthesized to generate image data A' corresponding to colors included in a second coloring system.

Other addresses on the color conversion table are taken under the same way as described above. Color conversion data are taken using the addresses on the color conversion table.

Color conversion data interpolation is conducted again to generate interpolation data. The interpolation data and the color conversion data are synthesized to generate image data B corresponding to colors included in a third coloring system.

Through the other color conversion explained above, the color reproductivity of the color monitor supplied the RGB color signal data and that of the color printer supplied the CMY color signal data are optimized.

The two methods define the color reproduction characteristics per device with inflexibility to reproduce the same color on different devices. However, evaluation of reproduced color depends on viewers and observing environment, etc.

Further, modification of color reproduction characteristics of a color printer can only be done by changing color modification parameters and printing out. However, printing out takes time and it costs too much. Further, the color reproduction characteristics of a color monitor and a color printer are different from each other. The color image printed by the printer thus cannot be reproduced on the monitor with identical colors.

Further, it is not so rare for an operator not to be satisfied with a color image reproduced on the monitor. Not only this, a color conversion table on a color printer includes sampled data ranging 8 to 16 bits, for example. Modification of a portion of the color conversion table thus generates distortion on the modified portion. This results in unnatural color reproduction.

SUMMARY OF THE INVENTION

An object of the invention is to provide a method and an apparatus for color reproduction where an operator can easily modify color image data.

The present invention provides a method of forming a first image with at least a first color included in a first coloring system and corresponding to first color signal data converted from second signal data corresponding to at least a second color included in a second coloring system and related to an original image, the method comprising the steps of: entering at least a color modification parameter corresponding to a difference between the first color and a third color related to the original image; optimizing the color modification parameter; calculating a first area to be modified and a first amount to be modified with respect to the original image in response to the optimized color modification parameter; forming a second image using the second color signal data on the basis of the first area and amount to be modified and another first image already formed; forming a third image using the first color signal data, the third image corresponding to the second color; and synthesizing the second and third images to form the first image.

Further, the present invention provides a method of modifying data on a color conversion table used for converting first color signal data into second color signal data, the first color signal data corresponding to at least a first color included in a first coloring system, the second color signal data corresponding to at least a second color included in a second coloring system, the method comprising the steps of: entering at least a color modification parameter indicating a first amount of data to be modified on the color conversion table; obtaining an area of the data to be modified in response to the first amount; and obtaining a plurality of second amounts of data to be modified, each second amount corresponding to a distance between a first point and a second point on which the data is to be modified on a color space within the area, thus modifying the data on the color conversion table using the second amounts.

Further, the present invention provides a method of converting first color signal data under $2^{n+m}$ gradations into second color signal data, the first color signal data corresponding to at least a first color included in a first coloring system, the second color signal data corresponding to at least a second color included in a second coloring system, the method comprising the steps of: entering color mode data indicating the first coloring system and first and second look-up table data; judging whether the color mode data is in RGB mode or not; inverting the first look-up table data to form a first look-up table if the color mode data is judged as in the RGB mode; rearranging the second look-up table data in reverse order to form a second look-up table if the color mode data is judged as in the RGB mode; processing the first color signal data using the first look-up table; converting the upper n bits of the processed first color signal data into main data of the second color signal data on the basis of the second look-up table; outputting interpolation coefficients related to the second look-up table; calculating interpolation data for interpolating the main data using the coefficients and the lower m bits of the first color signal data; and adding the main data and the interpolation data to output the second color signal data.

Further, the present invention provides a method of converting first color signal data in RGB mode under $2^{n+m}$ gradations into second color signal data, the first color signal data corresponding to at least a first color included in a first coloring system, the second color signal data corresponding to at least a second color included in a second coloring system, the method comprising the steps of: entering color table data composed of pre-inverted first look-up table data and second look-up table data pre-rearranged in reverse order; separating the color table data into the first look-up table data and the second look-up table data; processing the first color signal data using the first look-up table; converting the upper n bits of the processed first color signal data into main data of the second color signal data on the basis of the second look-up table; outputting interpolation coefficients related to the second look-up table; calculating interpolation data for interpolating the main data using the coefficients and the lower m bits of the first color signal data; and adding the main data and the interpolation data to output the second color signal data.

Further, the present invention provides an apparatus for color signal adjustment with supplying table data to a printer that modifies a first color signal corresponding to at least a color included in a first coloring system using first input look-up table data, converts the modified first color signal into a second color signal corresponding to at least a color included in a second coloring system using at least first color conversion look-up table data, and adjusts the second color signal so as to be printed as first image using first output look-up table data with the entered table data for printing, the apparatus comprising; a memory to store second input look-up table data, second color conversion look-up table data and second output look-up table data identical to the first input look-up table data, the first color conversion look-up table data and the first output look-up table data, respectively; a calculator to calculate color data on at least an area of a second image displayed on a monitor; a simulator to simulate the calculated color data on the basis of the second input look-up table data and the second color conversion look-up table data stored in the memory; and a generator to generate a first displaying signal indicating the simulated color data, the first displaying signal being displayed on the monitor as at least a graph indicating input and output characteristics related to the second output look-up table, thus adjusting the first image so as to match the second image.

Further, the present invention provides a method of color signal adjustment with supplying table data to a printer that modifies a first color signal corresponding to at least a color included in a first coloring system using first input look-up table data, converts the modified first color signal into a second color signal corresponding to at least a color included in a second coloring system using at least first color conversion look-up table data, and adjusts the second color signal so as to be printed as first image using first output look-up table data with the entered table data for printing, the method comprising the steps of; entering second input look-up table data, second color conversion look-up table data and second output look-up table data identical to the first input look-up table data, the first color conversion look-up table data and the first output look-up table data, respectively; calculating color data on at least an area of a second image displayed on a monitor; simulating the calculated color data on the basis of the second input look-up table data and the second color conversion look-up table data; and generating a first displaying signal indicating the simulated color data, the first displaying signal being displayed on the monitor as at least a graph indicating input and output characteristics related to the second output look-up table, thus adjusting the first image so as to match the second image.

DETAILED DESCRIPTION OF PREFERRED EMBODIMENTS

Preferred embodiments according to the present invention will be disclosed with reference to the attached drawings.

Figure 1:
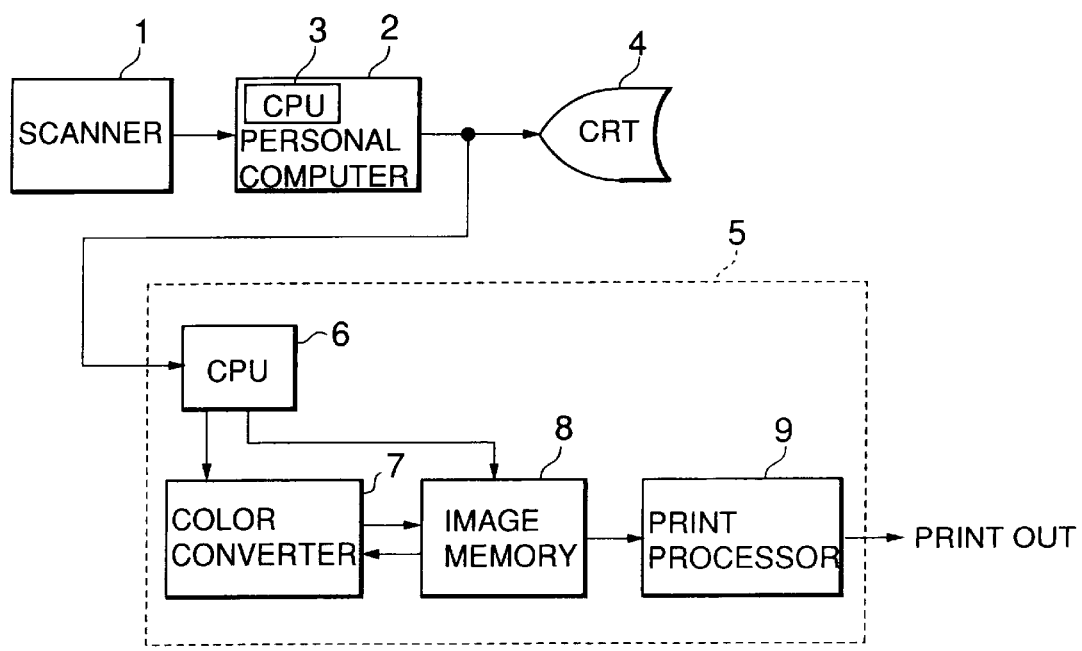
FIG. 1 is a basic block diagram of a color reproduction apparatus according to the present invention.

In FIG. 1, three-dimensional color signal data supplied from a color scanner 1 to a personal computer 2 with a central processing unit (CPU) 3 are displayed on a color monitor 4 with a cathode ray tube (CRT) and supplied to a CPU 6 of a color printer 5.

The CPU 6 supplies the color signal data to a color converter 7. The CPU 6 further controls an image memory 8 to store the color signal data processed by the color converter 7. The color signal data stored in the image memory 8 are supplied to a print processor 9. The color signal data are processed by the print processor 9 and printed out as a color image the same as that displayed on the color monitor 4.

Figure 2:
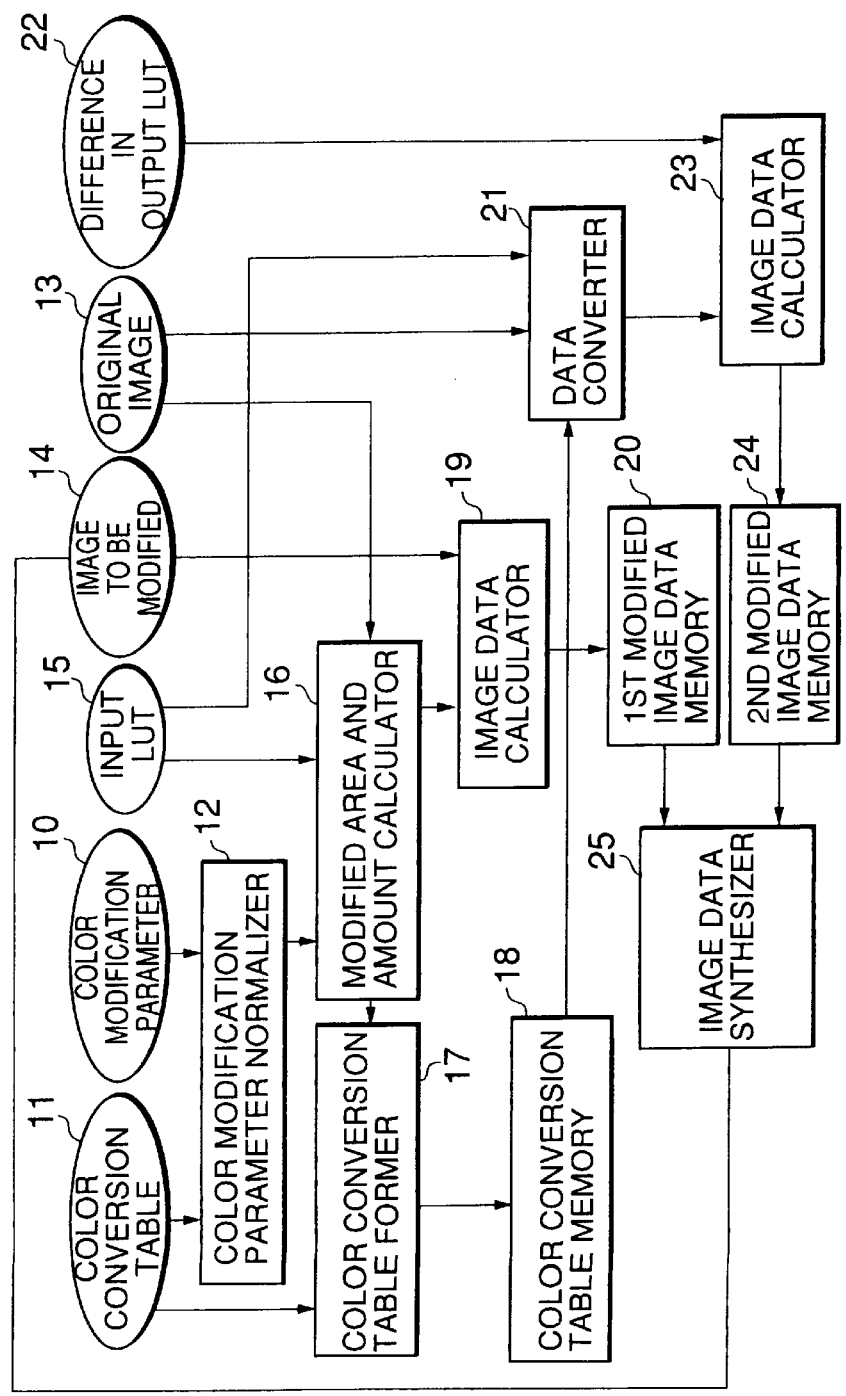
FIG. 2 is a block diagram for color reproduction as the first embodiment according to the present invention.

A circuit block diagram shown in FIG. 2 is installed in the CPU 3 of the personal computer 2.

Color modification parameters 10 entered by an operator to modify colors of a printed image into the personal computer are normalized by a color modification parameter normalizer 12 with a color conversion table 11.

Figure 3:
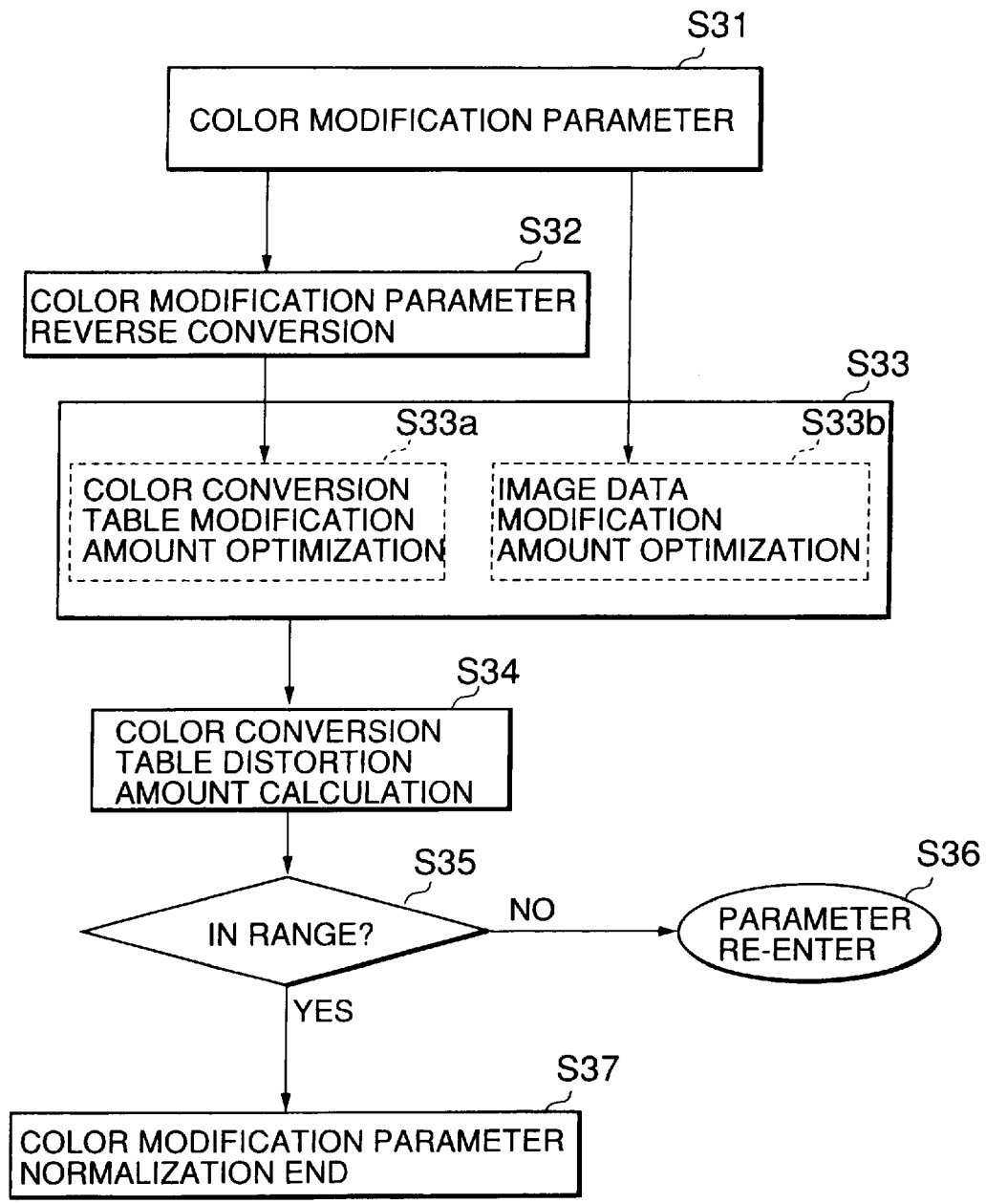
FIG. 3 is a flow chart for explaining an operation of a color modification parameter normalizer shown in FIG. 2.

According to the flow chart shown in FIG. 3, the color modification parameters 10 entered by the operator (step S31) are subjected to reverse conversion (step S32). For example, a color modification parameter (+5) is converted so that an amount to be modified on the color conversion table 11 is (−5).

Next, strength of color is optimized (step S33) for a color monitor such as CRT and a color printer (both not shown). Conducted in step S33 are optimization of a modified amount on the color conversion table 11 to reverse-converted color modification parameters 10 (step S33a) and that of a modified amount to the color modification parameters 10 not subjected to the reverse conversion (step S33b).

Here, the strength of color to be optimized in step S33 includes anything such as a white balance for adjusting lightness, saturation or hue.

In case of the white balance, the initial condition is (R, G, B)=(1.0, 1.0, 1.0). When the operator enters the color conversion parameters 10 such as (R, G, B)=(1.2, 1.0, 1.0), the change is increase of 0.2 in R color signal data only. Reverse conversion is then made to the color conversion parameters such as (R, G, B)=(0.8, 1.0, 1.0) on the color conversion table 11 (step S33a) for the color printer.

On the other hand, the image data modification amounts are optimized such as (R, G, B)=(1.4, 1.0, 1.0) in step S33b for the color monitor. This is because, the color conversion parameters 10 are basically changed to (R, G, B)=(1.2, 1.0, 1.0) for the color image on the color monitor. However, the same change R=0.2 in both the color monitor and printer will cause difference in color of images when observed.

The optimization to the reverse-converted color modification parameters 10 and to the color modification parameters 10 not subjected to the reverse conversion is conducted because the color monitor and printer exhibit different color reproduction characteristics and reproduce different color images even using the same color modification parameters 10.

The optimization is conducted to obtain the same final strength of color as described above under consideration of the different color reproduction characteristics of the color monitor and printer. The color monitor's color reproduction characteristics is linear and hence decided using the matrix shown below to convert the RGB color signal data into tristimulus values XYZ.

$$\begin{pmatrix} X \\ Y \\ Z \end{pmatrix} = \begin{pmatrix} Xr & Xg & Xb \\ Yr & Yb & Yg \\ Zr & Zg & Zb \end{pmatrix} \begin{pmatrix} R \\ G \\ B \end{pmatrix}$$

On the other hand, the color printer's color reproduction characteristics is decided by obtaining color modification parameters according to locations on the color reproduction space by means of direct mapping and well known regression analysis, etc., due to nonlinearlity of the color printer's color reproduction characteristics.

The direct mapping is disclosed for example in U.S. Pat. No. 5, 264, 927. In the direct mapping, three-dimensional color signal data corresponding to colors included in a first coloring system are divided into an upper digit bit group and a lower digit bit group. Color signal data corresponding to the upper digit bit group are converted into three-dimensional color signal data corresponding to colors included in a second coloring system and stored in a look-up table. The three-dimensional color signal data are then read from the look-up table using the color signal data corresponding to the upper digit bit group as address signals. The three-dimensional color signal data read from the look-up table are interpolated using color signal data corresponding to the lower digit bit group.

Next, in FIG. 3, a distorted amount on the color conversion table 11 is calculated (step S34) using the color modification parameters to which the normalization of the color conversion table modification amount has been conducted. It is judged whether the distorted amount is within a predetermined range or not (step S35). If not, the operator is requested to enter new color modification parameters (step S36). On the other hand, if the distortion amount is within the predetermined range, the color modification parameter normalization process ends (step S37).

Again in FIG. 2, on the basis of the color modification parameters normalized by the color conversion parameter normalizer 12, a modified area and amount calculator 16 calculates an area and amount to be modified of color signal data from an input look-up table (LUT) 15 using color signal data of an original image 13 displayed on the color monitor (not shown).

Data on the input LUT 15 and also data stored in a color conversion table memory 18 are sent to the color printer. Further, output LUT data which is modified and related to difference data on an output LUT 22 is also sent to the color printer.

Next, a color conversion table former 17 is to form a color conversion table used for conversion of color signal data (RGB color signal data) corresponding to colors of a first coloring system to colors of a second coloring system (CMYK color signal data) to be printed by the color printer. The table former 17 modifies the color conversion table 11 to form a new color conversion table on the basis of the output data of the color modification normalizer 12 and the modified area and amount calculator 16. The newly formed color conversion table is stored in the color conversion table memory 18.

An image data calculator 19 calculates RGB color signal data of an image 14 to be modified on the basis of the output data of the modified area and amount calculator 16. The calculated RGB color signal data are then stored in a first modified image data memory 20 as the first modified image data.

A data converter 21 converts RGB color signal data of the original image 13 through the input LUT 15 and further converts the converted RGB color signal data into CMYK color signal data using the color conversion table stored in the color conversion table memory 18. The CMYK color signal data are then supplied to an image data calculator 23.

In response to the CMYK color signal data, the image data calculator 23 calculates color signal data using the difference data 22 of the output LUT. The calculated color signals data corresponds to the CMYK color signal data related to the original image 13 to which color modification is made. The image data calculator 23 then re-converts the calculated color signal data into RGB color signal data to be displayed on the color monitor. The RGB color signal data are then stored in a second modified image memory 24 as the second modified image data. The second modified image data output from the image data calculator 23 will be zero if the difference data 22 is zero, or there is no change.

The first and second modified image data from the first and second modified image memories 20 and 24, respectively, are synthesized by an image data synthesizer 25 and displayed on the color monitor. The synthesized image data would be further modified as another image 14.

The color modification described above will be repeated until the operator is satisfied with color reproductivity of the images displayed on the color monitor and printed by the color printer.

As described above, according to the first preferred embodiment, in order to modify colors of a color image printed by the color printer while observing a color image on the color monitor, the operator enters color modification parameters corresponding to differences between a color image required by the operator and the printed color image to simulate an image on the personal computer by modifying the image 14 on the color monitor using color modification parameters while modifying the color conversion table supplied to the color printer from the personal computer so that the modified color conversion table includes parameters into which the color modification parameters are reverse-converted.

Accordingly, when the operator judges that a printed image of the original image 13 has high saturation, the operator enters color modification parameters 10 indicating high saturation into the personal computer, the first modified image thus having high saturation due to no reverse-conversion of the color modification parameters, to modify the color image 14 on the color monitor with higher saturation than the original image 13 in accordance with the color modification parameters.

Entry of the color modification parameters 10 indicating high saturation causes conversion into the color modification parameters 10 indicating low saturation in step S32 of FIG. 3. In response to this, the color conversion table is formed by the color conversion table former 17 of FIG. 2 and supplied to the color printer. The colors printed by the printer have lower saturation on the basis of the color conversion table after modification than the printed image of the original image before modification. Therefore, a desired saturation or an almost desired saturation can be attained.

The second preferred embodiment will be described next. The process shown by a flow chart of FIG. 4 is executed by the modified area and amount calculator 16 shown in FIG. 2.

Figure 4:
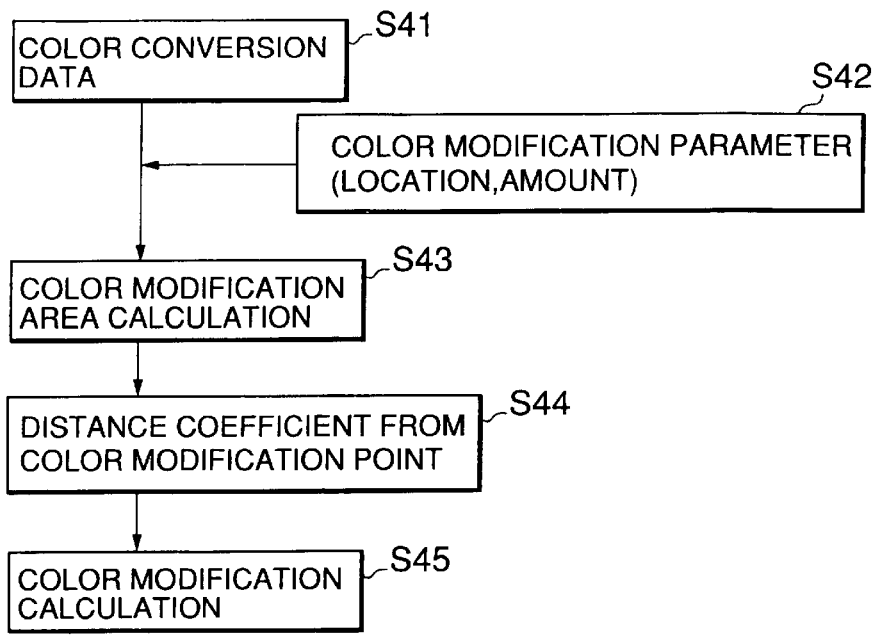
FIG. 4 is a flow chart for explaining an operation of a modified area and amount calculator shown in FIG. 2 as the second embodiment according to the present invention.

In FIG. 4, the modified area and amount calculator 16 takes color conversion data indicating addresses of grid-crossing points of a unit cubic grid in a three-dimensional color space on the color conversion table 11 (step S41). The unit cubic grid will be described in detail with reference to FIG. 9.

The modified area and amount calculator 16 further accepts color modification parameters indicating locations and amounts of gradation of colors to be modified on the cubic grid (step S42), calculates an area of gradation of colors to be modified (called modification area hereinafter) on the basis of the color conversion data around the color modification parameters (step S43), obtains distance coefficients from points on which gradations of colors are to be modified (called modification point hereinafter) to other points of gradations in the modification area and, on the basis of the resultants, calculates amounts of gradation of colors to be modified (called modification amount hereinafter) according to the following expression:

$$dV(dE) = V \times \{1.0 + \cos(dE \times \pi/E)\}/2.0$$

where dV denotes the modification amount depending on the distance from the modification points to the other gradation points in the modification area in the three-dimensional color space, V the modification amounts on the modification points, dE the distance from the modification points to the other gradation points in the modification area and E the maximum value of the distance. The larger the modification amount V the larger the maximum value E to reduce distortion in the color reproduction space after modification.

The maximum value E is obtained in step S43. Each distance coefficient obtained in step S44 is the multiplication coefficient on the right side of the above expression. The modification amounts obtained in step S45 is used for modifying data on the color conversion table formed by the color conversion table former 17.

Color reproduction with the modified color conversion table 11 will be explained with reference to two-dimensional graphs in FIGS. 5A to 5D.

Figure 5A:
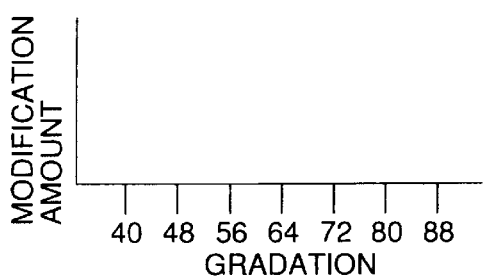
FIGS. 5A to 5D are graphs exhibiting color reproduction with modified color conversion table.
Figure 5B:
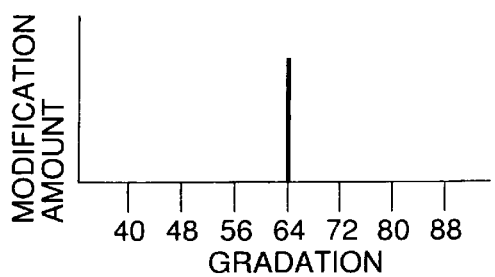

FIG. 5A exhibits the relationship between gradations before modification and modification amounts. FIG. 5B exhibits the relationship between a modified gradation and a modification amount under modification in the area of 64 gradation (called 64-gradation point hereinafter).

Figure 5C:
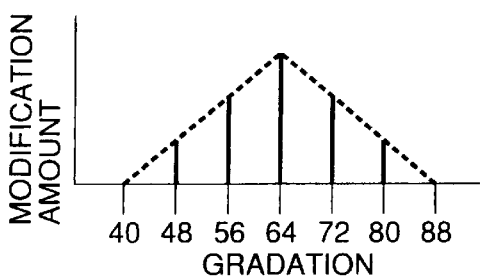

Further, FIG. 5C exhibits the relationship between modified gradations and modification amounts on the 64-gradation point and other gradation points with modifications which are inverse proportion to the distance from the 64-gradation point.

There is a big gap on modification amount between the modified 64-gradation point and the other points with no modification in FIG. 5B. This results in a rough color gradation when reproduced. On the other hand, the modification shown in FIG. 5C will generate smooth gradation when reproduced, however, still not enough on the gradation points with smaller modification than that on the 64-gradation point.

Figure 5D:
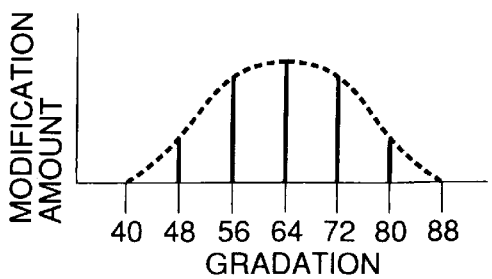

On the contrary, according to the second embodiment in which the modification amount is calculated using the above expression, the relationship between the gradations and modification amounts is as shown in FIG. 5D which exhibits smooth change in modification amount in accordance with the distance from the 64-gradation point to the other points. Compared with conventional color reproduction shown in FIGS. 5B and 5D, the second embodiment shown in FIG. 5D attains more natural color images when reproduced.

According to the present invention as described above, an image is simulated on a color monitor to modify a color image, for example, printed by a color printer under the consideration of the difference between a desired color image and the printed image with entry of the parameters indicating the difference for modifying the color conversion table.

Therefore, a color image output from a device such as a color printer can be modified while observing an image simulated on a color monitor with color reproduction characteristics different from that of the color printer.

Further according to the present invention, in partial modification of the color conversion table, modification amounts are varied according to the distance from the modification point to other points in the modification area as shown in FIG. 5D. Therefore, color images with natural and smooth color reproduction can be attained.

The third preferred embodiment will be described next.

Figure 6:
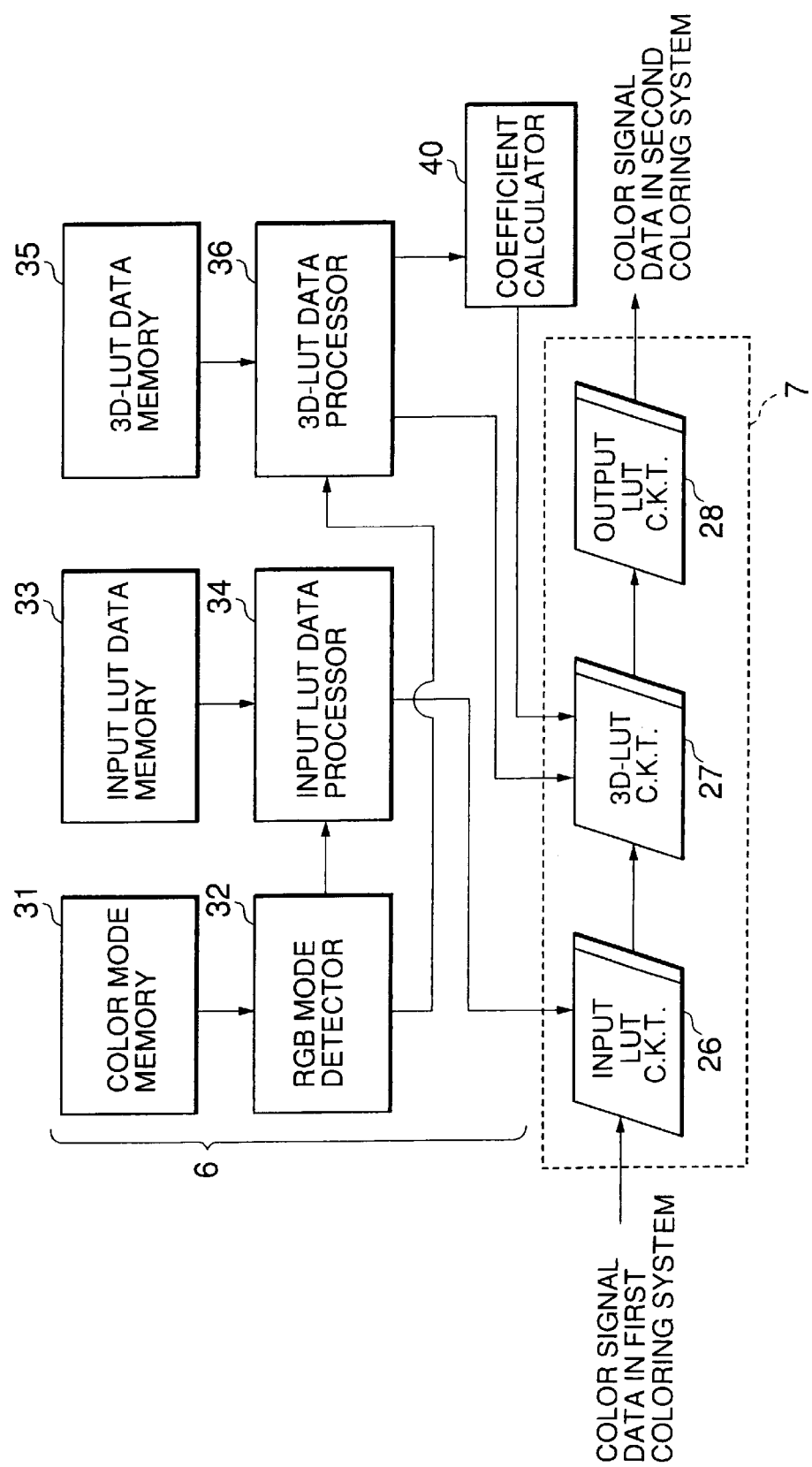
FIG. 6 is a block diagram of a CPU and a color converter installed in a color printer as the third embodiment according to the present invention.

In FIG. 6, the CPU 6 of FIG. 1 includes a color mode memory 31, an input LUT data memory 33, a three-dimensional (3D-) LUT data memory 35, a RGB mode detector 32, an input LUT data processor 34, a 3D-LUT data processor 36 and an interpolation coefficient calculator 40.

Figure 7:
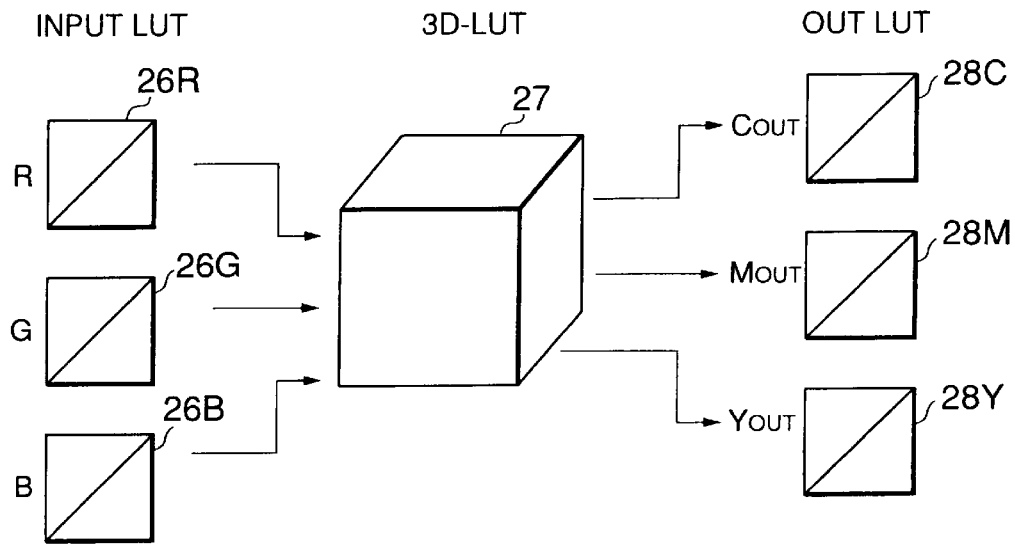
FIG. 7 illustrates color signal processing among input LUT circuits, a 3D-LUT circuit and output LUT circuits.
Figure 8:
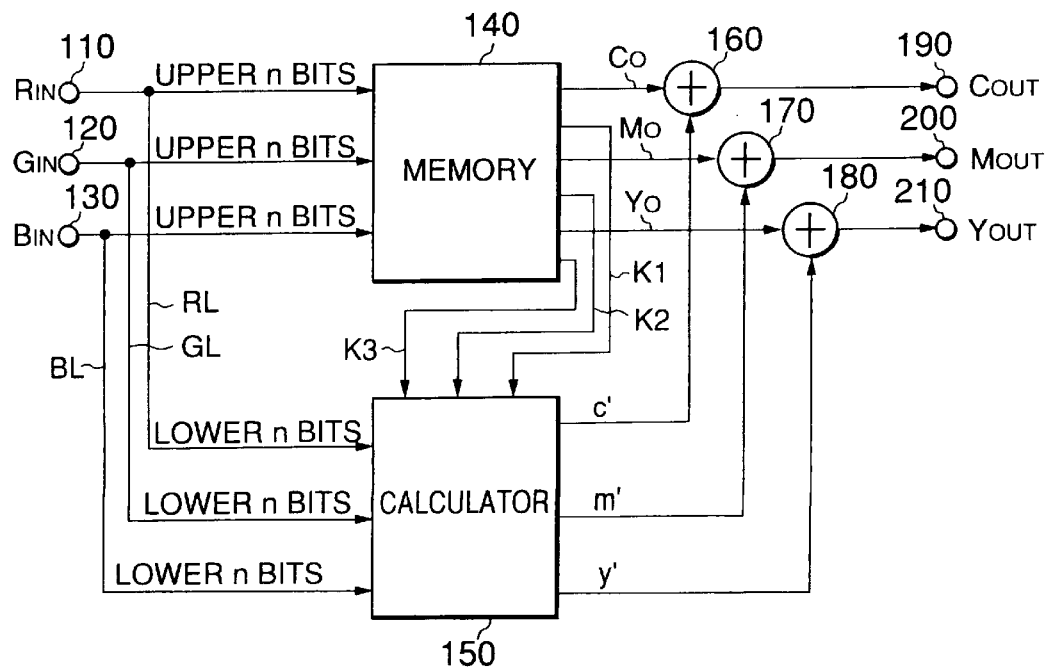
FIG. 8 is a block diagram of the 3D-LUT circuit.

Further, the color converter 7 of FIG. 1 includes an input LUT circuit 26, a 3D-LUT circuit 27 and an output LUT circuit 28. The circuits 26, 27 and 28 are also shown in FIG. 7. Further, a detailed circuit configuration of the 3D-LUT circuit 27 is shown in FIG. 8.

In FIG. 7, input LUTs 26R, 26G and 26B are included in the input LUT circuit 26. And, output LUT circuits 28C, 28M and 28Y are included in the output LUT circuit 28.

Three-dimensional color signals Rin, Gin and Bin corresponding to colors included in a first coloring system are supplied to the input LUTs 26R, 26G and 26B, respectively, and their signal levels are adjusted.

The adjusted color signals Rin, Gin and Bin are supplied to the 3D-LUT circuit 27 and converted into three-dimensional color signals Cout, Mout and Yout, respectively, corresponding to colors included in a second coloring system.

The color signals Cout, Mout and Yout are then supplied to the output LUT circuits 28C, 28M and 28Y, respectively, and their signal levels are adjusted. The adjusted color signals are supplied to the image memory 8 shown in FIG. 1.

Next, the 3D-LUT circuit 27 includes a memory 140, a calculator 150 and adders 160, 170 and 180 as shown in FIG. 8.

In FIG. 8, the upper n bits of the color signals Rin, Gin and Bin are supplied to the memory 140 via input terminals 110, 120 and 130, respectively. On the other hand, the lower n bits of the color signals Rin, Gin and Bin are supplied to the calculator 150 via the input terminals 110, 120 and 130, respectively.

The memory 140 has already stored 3D-LUT data for converting the color signals Rin, Gin and Bin into main data Co, Mo and Yo as three-dimensional signals C(cyan), M(magenta) and Y(yellow), respectively, corresponding to the colors included in the second coloring system. Also pre-stored in the memory 140 are interpolation coefficients Kr1 to Kr3, Kg1 to Kg3 and Kb1 to Kb3 used for color conversion by the calculator 150. These pre-stored data are rewritable data.

In response to the upper n bits of the color signals Rin, Gin and Bin, the main data Co, Mo and Yo and the interpolation coefficients Kr1 to Kr3, Kg1 to Kg3 and Kb1 to Kb3 are read from the memory 140.

The main data Co, Mo and Yo are supplied to the adders 160, 170 and 180, respectively. On the other hand, the interpolation coefficients Kr1 to Kr3, Kg1 to Kg3 and Kb1 to Kb3 are supplied to the calculator 150.

In FIG. 8, K1 represents the interpolation coefficients Kr1, Kg1 and Kb1, K2 represents Kr2, Kg2 and Kb2 and K3 represents Kr3, Kg3 and Kb3.

The calculator 150 generates interpolation data c', m' and y' for interpolating among the main data Co, Mo and Yo with the interval $2^m$ using the lower m bits data RL, GL and BL of the color signals Rin, Gin and Bin. The interpolation data c', m' and y' are supplied to the adders 160, 170 and 180, respectively.

The adders 160, 170 and 180 add the main data Co, Mo and Yo and the interpolation data c', m' and y', respectively, and output three-dimensional color signal data Cout, Mout and Yout, respectively, corresponding to the colors included in the second coloring system. The color signals Cout, Mout and Yout are then supplied to the output LUT circuits 28C, 28M and 28Y via output terminals 190, 200 and 210, respectively.

The color processing described above can be expressed as follows:

$$\begin{pmatrix} Cout \\ Mout \\ Yout \end{pmatrix} = \begin{pmatrix} Kr1 & Kg1 & Kb1 \\ Kr2 & Kg2 & Kb2 \\ Kr3 & Kg3 & Kb3 \end{pmatrix} \begin{pmatrix} RL \\ GL \\ BL \end{pmatrix} + \begin{pmatrix} Co \\ Mo \\ Yo \end{pmatrix} \quad (1)$$

Figure 9:
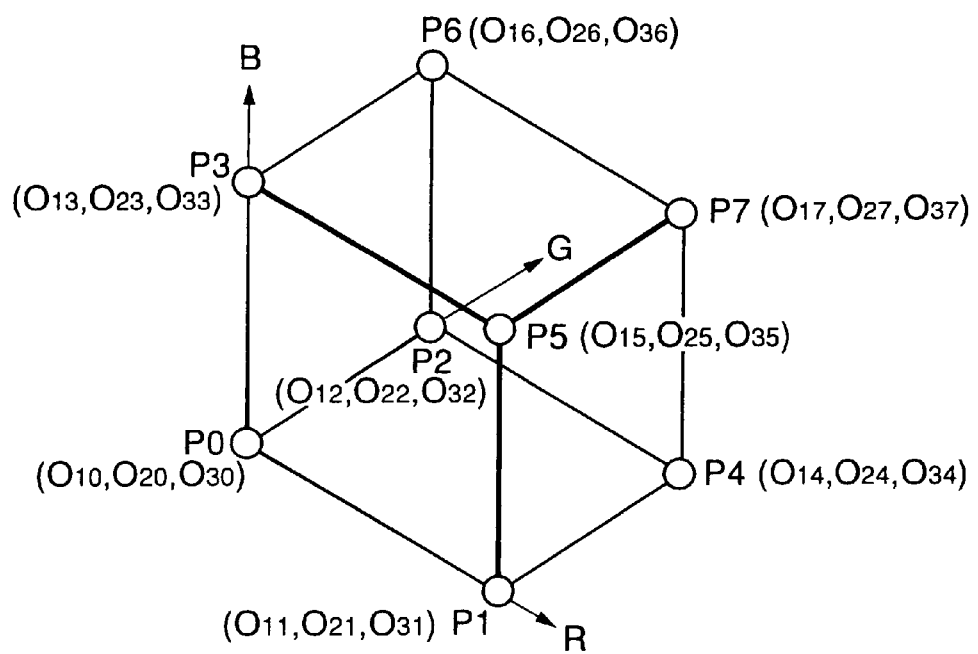
FIG. 9 illustrates a unit cubic grid of color signals.

The above expression indicates that if a unit cubic grid of O1i=C, O2i=M and O3i=Y (i=0 to 7) shown in FIG. 9 is extremely small, it can be said that change in C, M and Y of the grid is linear, thus C, M and Y can be expressed by primary combination of vectors R, G and B.

There are two methods to decide the interpolation coefficients Kri, Kgi and Kbi (i=1 to 3). One is to minimize an error on a point P7 of the unit cubic grid in a color space as shown in FIG. 9. This means that it is required that values of C, M and Y on the point P7 obtained using the main data and interpolation data on a point Po be identical to the already obtained values of C, M and Y on the point P7. The point P7 is a grid point strongly related to change in achromatic color's lightness. This requires that errors that human eyes exhibit to white balance be minimized. The other method is to minimize a difference between interpolation results and the already obtained values Oij (j=1 to 6) of C, M and Y on the points P1 to P6.

Explained below is the case where, in FIG. 8, the input color signals Rin, Gin and Bin are all composed of eight bits to obtain the main data Co, Mo and Yo using the upper four bits (n=4) of the input signals and the interpolation data c', m' and y' using the lower four bits (m=4) of the input signals and the interpolation coefficients Kr1 to Kr3, Kg1 to Kg3 and Kb1 to Kb3.

Here, the condition that the values of C, M and Y on the point P7 in FIG. 9 and the values obtained using the main data and interpolation data on the point P0 are identical to each other is as follows using the expression (1):

$$\begin{pmatrix} O17 \\ O27 \\ O37 \end{pmatrix} = \begin{pmatrix} Kr1 & Kg1 & Kb1 \\ Kr2 & Kg2 & Kb2 \\ Kr3 & Kg3 & Kb3 \end{pmatrix} \begin{pmatrix} 2^4 \\ 2^4 \\ 2^4 \end{pmatrix} + \begin{pmatrix} O10 \\ O20 \\ O30 \end{pmatrix} \quad (2)$$

where Oij denote the values of C, M and Y on the grid points.

From the expression (2), the following expression is obtained:

$$Kri + Kgi + kbi = (Oi7 - Oi0)/16 = \Delta i7 \quad (3)$$

On the other points, the following expression (4) can be obtained by taking square of errors on the points and adding them together:

$$\delta = 16\{(Kri-\Delta i1)^2 + (Kgi-\Delta i2)^2 + (Kbi-\Delta i3)^2 + (Kri+Kgi-\Delta i4)^2 + (Kri+Kbi-\Delta i5)^2 + (Kgi+Kbi-\Delta i6)^2\} \quad (4)$$

where $\Delta ij$ is a constant expressed by $(Oij-Oi0)/16$.

Now, the operations of the CPU 6 and the color converter 7 shown in FIG. 6 will be explained with reference to FIG. 10.

Figure 10:
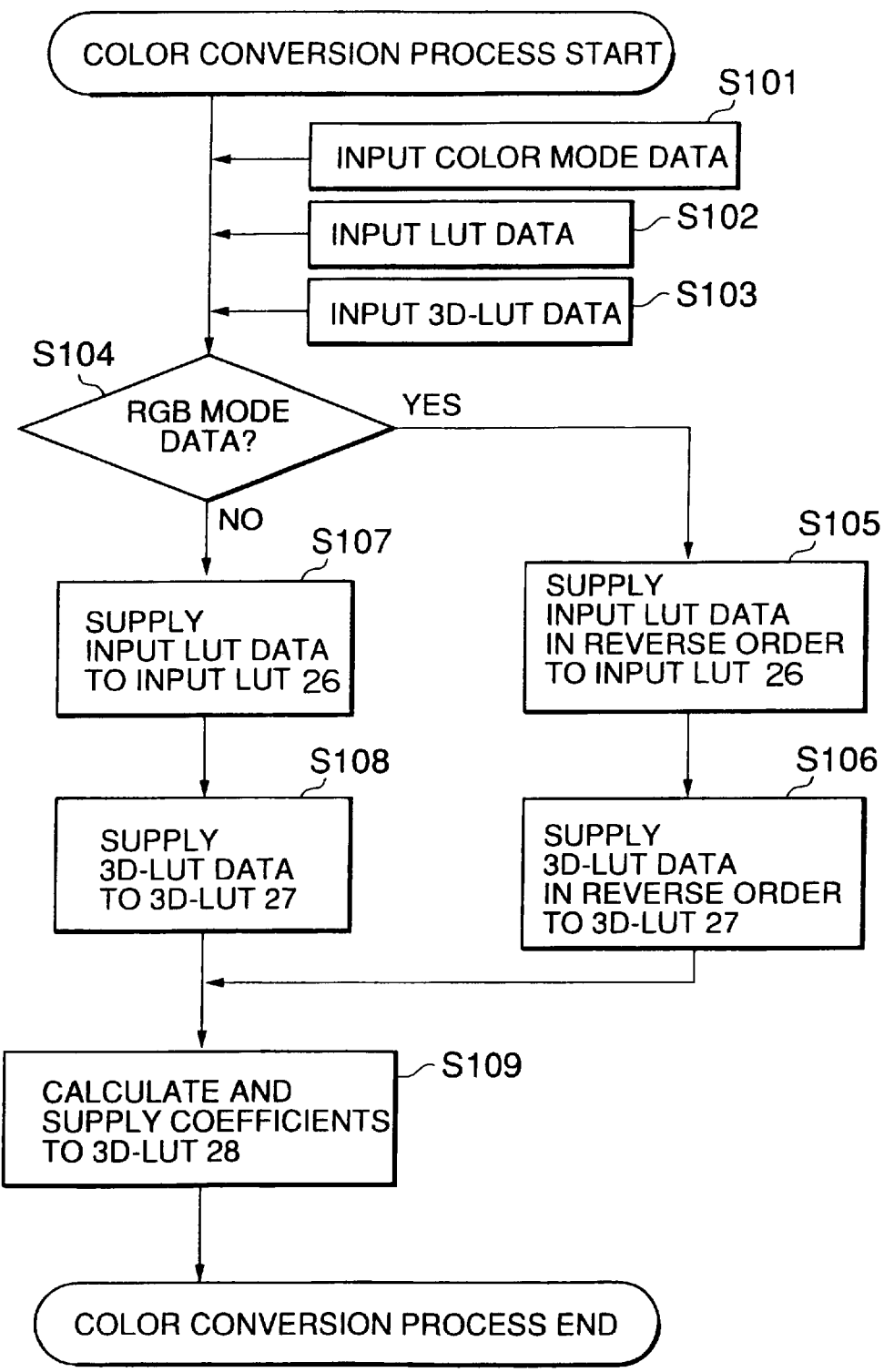
FIG. 10 is a flow chart for explaining the operation of the third embodiment according to the present invention.

According to the flow chart shown in FIG. 10, supplied to the CPU 6 from the personal computer are color mode data, input LUT data, 3D-LUT data and color signal data of 8 bits, for example. The color signal data correspond to the colors included in the first coloring system (RGB system in this embodiment).

The color mode data, input LUT data and 3D-LUT data are stored in the color mode memory 31, input LUT data memory 33 and 3D-LUT data memory 35 in steps S101, S102 and S103, respectively.

The color mode data are supplied from the color mode memory 31 to the RGB mode detector 32 which determines whether the supplied data are RGB mode data or not and supplies a detection signal indicating whether the data are the RGB mode data or not to the input LUT data processor 34 and the 3d-LUT data processor 36 (step S104).

In response to the detection signal, when the supplied data are the RGB mode data, the input LUT data processor 34 inverts input LUT data r, g and b supplied from the input LUT data memory 33 into (255-r), (255-g) and (255-b) and supplies the inverted data to the input LUT circuit 26 (step S105).

Further, in response to the detection signal, when the supplied data are the RGB mode data, the 3D-LUT data processor 36 rearranges the 3D-LUT data aligned with data (0, 16, 32, . . . , 240, 255) supplied from the 3D-LUT data memory 35 in reverse order such as (255, 239, 223, . . ., 15, 0) by the eight-point interpolation so that a white color is located on the point (R, G, B)=(255, 255, 255) under 16 gradations but 15 gradations at the last unit cubic grid as shown in FIG. 9 only. The rearranged data are then stored in the memory 140 of the 3D-LUT circuit 27 shown in FIG. 8 (step S106).

On the other hand, when the data supplied to the RGB mode detector 32 are not the RGB mode data but YMCK mode or Lab mode data, for example, the input LUT data processor 34 supplies the input LUT data from the input LUT data memory 33 to the input LUT circuit 26 as they are with no rearrangement (step S107).

Further, when the data supplied to the RGB mode detector 32 are not the RGB mode data, the 3D-LUT data processor 36 supplies the 3D-LUT data from the input LUT data memory 35 and aligned with the data (0, 16, 32, . . . , 240, 255) to the memory 140 of the 3D-LUT circuit 27 as they are with no rearrangement (step S108).

The 3D-LUT data as they are or rearranged in the reverse order by the 3D-LUT data processor 36 are supplied to the interpolation coefficient calculator 40. The calculator 40 obtains, on the basis of the supplied 3D-LUT data, interpolation coefficients Kr1 to Kr3, Kg1 to Kg3 and Kb1 to Kb3 from the upper n bits of the color signals corresponding to the colors included in the first coloring system as described with reference to FIGS. 7 to 9. The interpolation coefficients Kr1 to Kr3, Kg1 to Kg3 and Kb1 to Kb3 are then stored in the memory 140 of the 3D-LUT circuit 27 shown in FIG. 6 (step S109).

Interpolation coefficients on the last stage unit cubic grid as shown in FIG. 9 are obtained by locating 256 points under 16 gradation interval using a specific equation, thus causing errors. However, the last unit cubic grid exhibits a black color on the point (R, G, B)=(0, 0, 0) which is hard to be detected by human eyes. On the other hand, the processing for obtaining the interpolation coefficients on the last unit cubic grid can be done with the simple eight-point interpolation.

The color signals Cout, Mout and Yout corresponding to the colors included in the second coloring system from the 3D-LUT circuit 27 are color-adjusted according to a look-up table in the output LUT circuit 28 and supplied to the image memory 8 of the color printer 5 shown in FIG. 1 for printing process as already described above.

The fourth preferred embodiment will be explained next.

Figure 11:
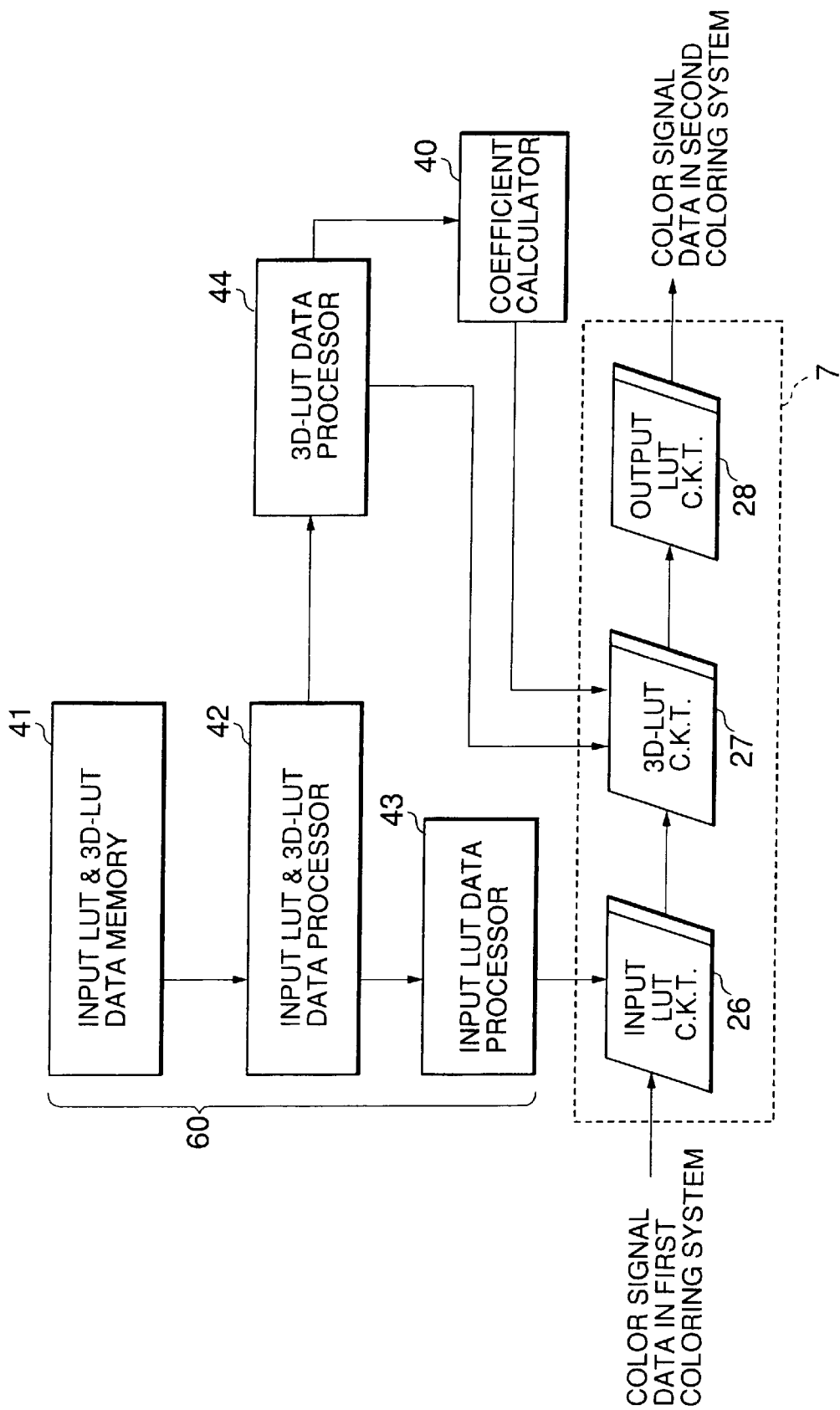
FIG. 11 is a block diagram of a CPU and a color converter installed in a color printer as the fourth embodiment according to the present invention.

In FIG. 11, elements in this embodiment that are the same as or analogous to elements in the third embodiment are referenced by the same reference numerals and will not be explained in detail.

In FIG. 11, a CPU 60 is employed instead of the CPU 6 in the color printer 5 shown in FIG. 1.

The CPU 60 includes an input LUT data and 3D-LUT data memory 41, an input LUT and 3D-LUT data separator 42, an input LUT data processor 43, a 3D-LUT data processor and the interpolation coefficient calculator 40 (the same as that shown in FIG. 6).

The color converter 7 includes the input LUT circuit 26, 3D-LUT circuit 27 and output LUT circuit 28 the same as those shown in FIG. 6.

Figure 12:
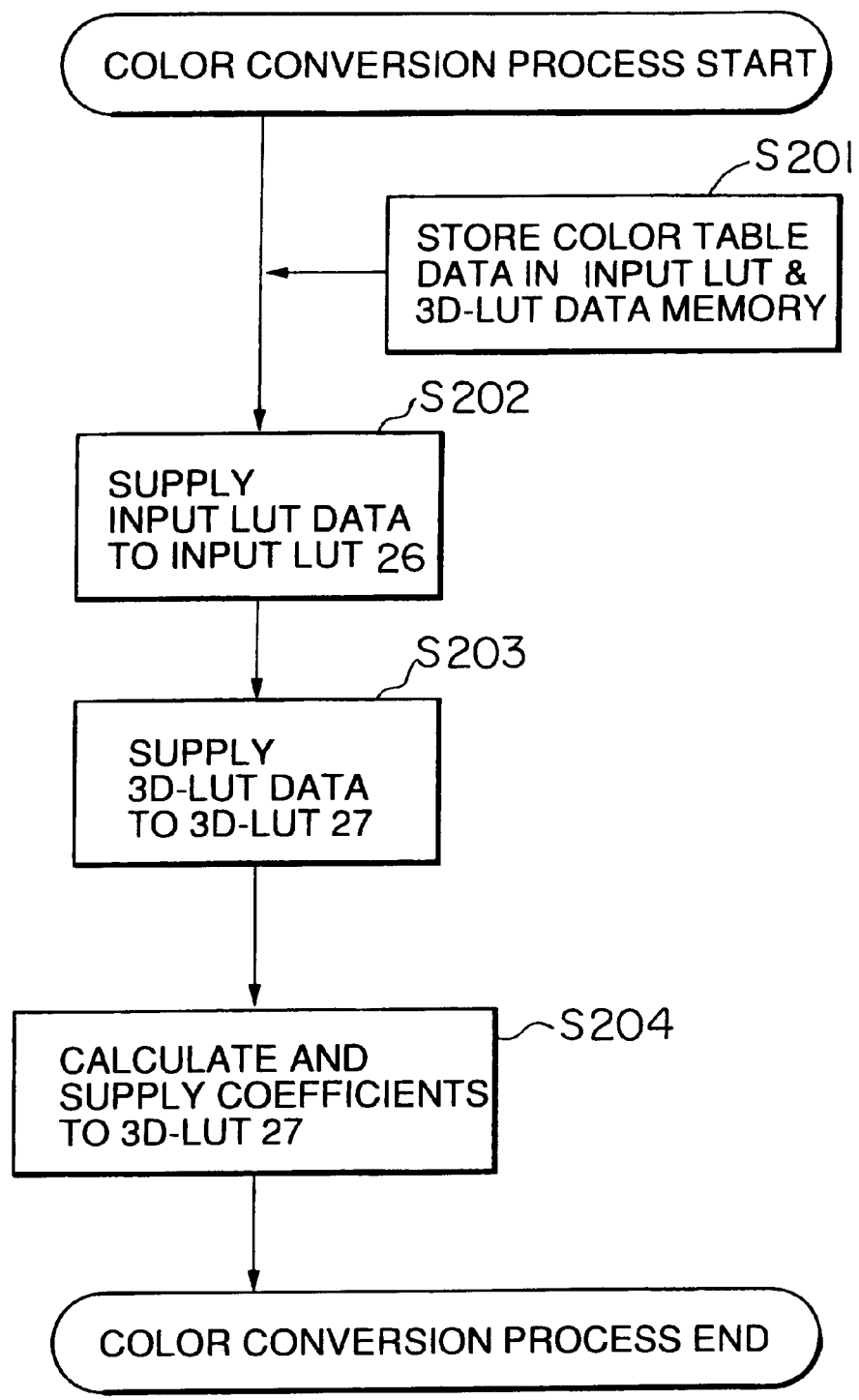
FIG. 12 is a flow chart for explaining the operation of the fourth embodiment according to the present invention.

According to the flow chart shown in FIG. 12, supplied to the CPU 60 from the personal computer 2 of FIG. 1 are color table data composed of input LUT data and 3D-LUT data and color signal data corresponding to colors included in the first coloring system.

The color table data are stored in the input LUT and 3D-LUT data memory 41 (step S201). The input LUT have already been inverted and the 3D-LUT data have already been rearranged in reverse order in RGB color mode such that original 3D-LTU data (0, 16, 32, . . . , 240, 255) are inverted into (255, 239, 223, . . . , 15, 0) starting with a white color (R, G, B)=(255, 255, 255) by the eight-point interpolation starting from 16 gradations to 15 gradations at the last unit cubic grid shown in FIG. 9. The inversion and rearrangement on the input LUT and 3D-LUT data are conducted only in RGB color mode.

The color table data read from the input LUT and 3D-LUT data memory 41 are supplied to the input LUT and 3D-LUT data separator 42 and separated into the input LUT data and the 3D-LUT data.

The input LUT data are supplied to the input LUT circuit 26 as they are via the input LUT data processor 43 (step S202). The 3D-LUT data are supplied to the 3D-LUT circuit 27 as they are via the 3D-LUT data processor 44 (step S203).

The 3D-LUT data are further supplied to the coefficient calculator 40 as they are via the 3D-LUT data processor 44. The coefficient calculator 40 calculates coefficients on the basis of the 3D-LUT data. The coefficients are then stored in the memory 140 of the 3D-LUT circuit 27 (step S204).

The data processing by the input LUT circuit 26, 3D-LUT circuit 27 and output LUT circuit 28 are the same as those described in the third embodiment.

According to the present invention, the input color data are rearranged such that a white color on a point of the last unit cubic grid in the color space comes first. This allows the values on the point of a white color on the unit cubic grid being used for color conversion without interpolation for the white of which errors can be easily detected by human eyes. Thus, a desired and preferable white can be attained with small errors.

The fifth preferred embodiment according to the present invention will be described next.

Figure 13:
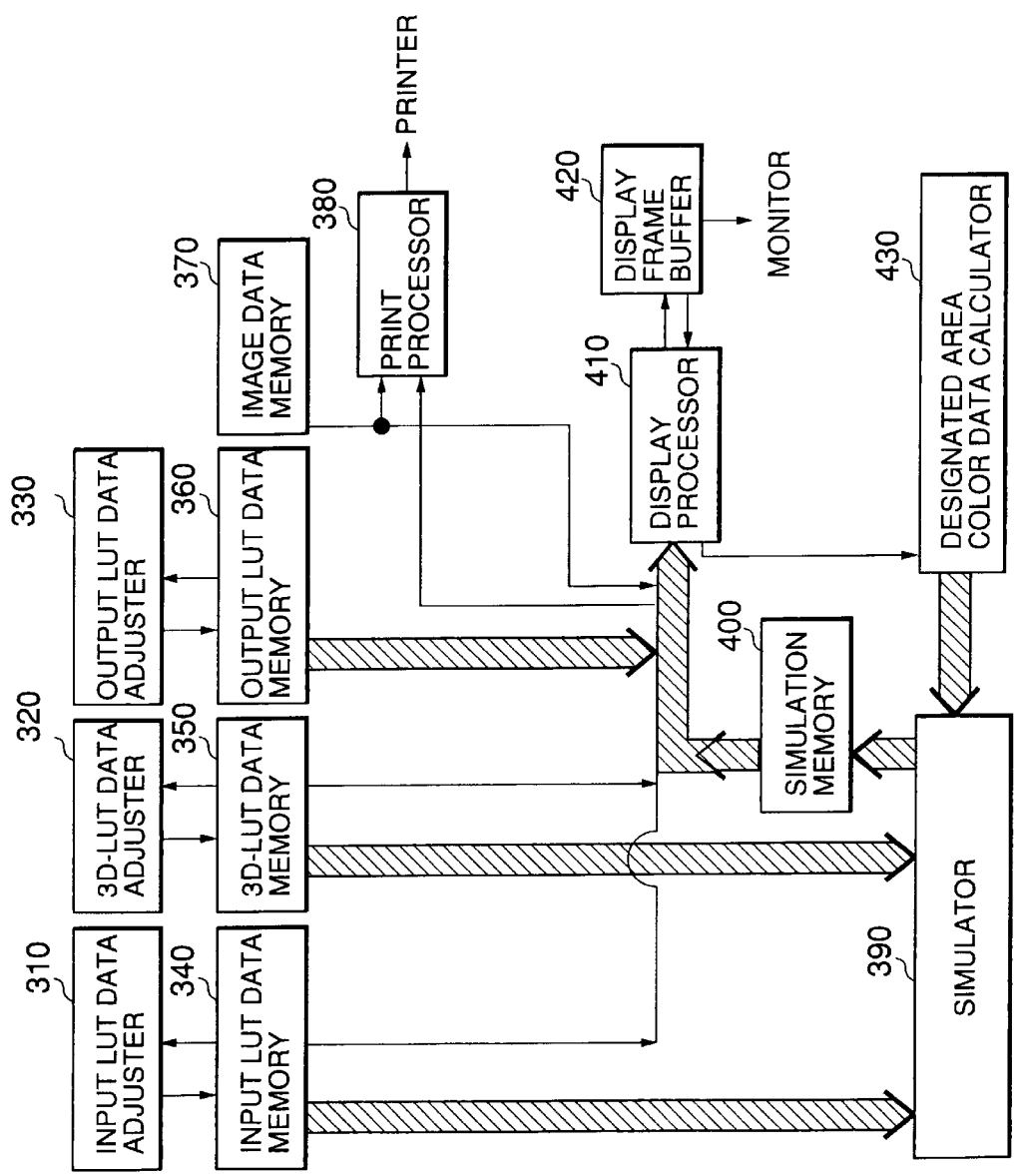
FIG. 13 is a block diagram of a color processing apparatus installed in a color printer as the fifth embodiment according to the present invention.
Figure 14A:
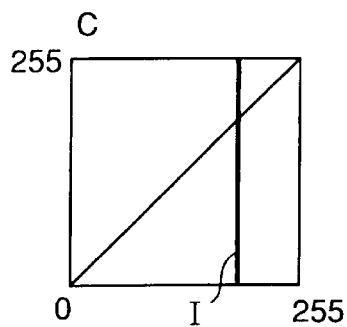
FIGS. 14A to 14D illustrate graphs displayed on a color monitor in the fifth embodiment according to the present invention.
Figure 14B:
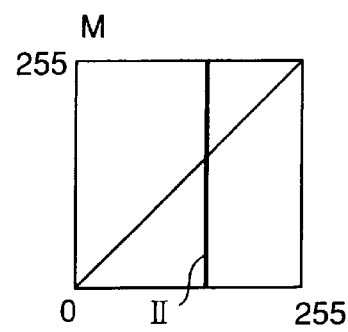
Figure 14C:
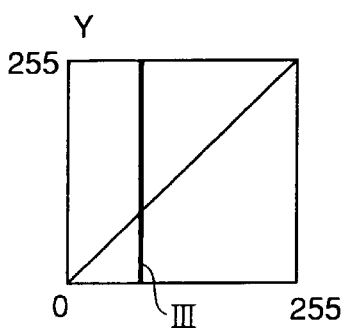
Figure 14D:
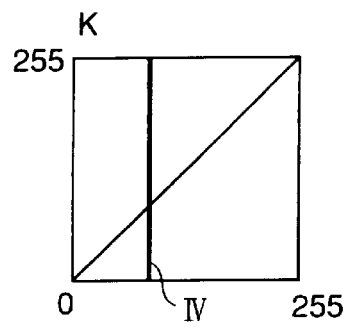

A color processing apparatus shown in a block diagram of FIG. 13 is installed in the CPU 3 of the personal computer 2 of FIG. 1.

In FIG. 13, an input LUT data memory 340, a 3D-LUT data memory 350 and an output LUT data memory 360 store look-up table data of the input LUT circuits 26R, 26G and 26B, the 3D-LUT circuit 27 and the output LUT circuits 28C, 28M and 28Y of FIG. 7, respectively.

The look-up table data of the memories 340, 350 and 360 are adjusted by an input LUT data adjuster 310, a 3D-LUT data adjuster 320 and an output LUT data adjuster 330, respectively, and supplied back thereto.

The adjusted look-up table data are then supplied to the color printer 5 via a print processor 380 as input LUT data, 3D-LUT data and output LUT data to be processed by the color printer 5.

FIGS. 14A to 14D show the relationship between the input and output signals of the output LUT circuits 28C, 28M and 28Y of FIG. 7 and can be displayed on the color monitor 4.

Figure 15:
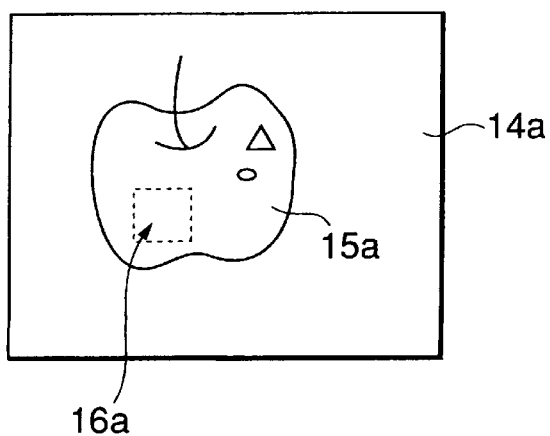
FIG. 15 illustrates an image displayed on a color monitor in the fifth embodiment according to the present invention.

Image data stored in an image data memory 370 are supplied to the color printer 5 via the print processor 380 for printing. The image data are also supplied to the color monitor 4 via a display processor 410 and a display frame buffer 420. The image data are displayed as shown in FIG. 15 where an operator can designate an area 16a of a color image 15a he or she wants to modify colors.

Now the operation of the color processing apparatus shown in FIG. 13 will be described with reference to FIG. 16.

Figure 16:
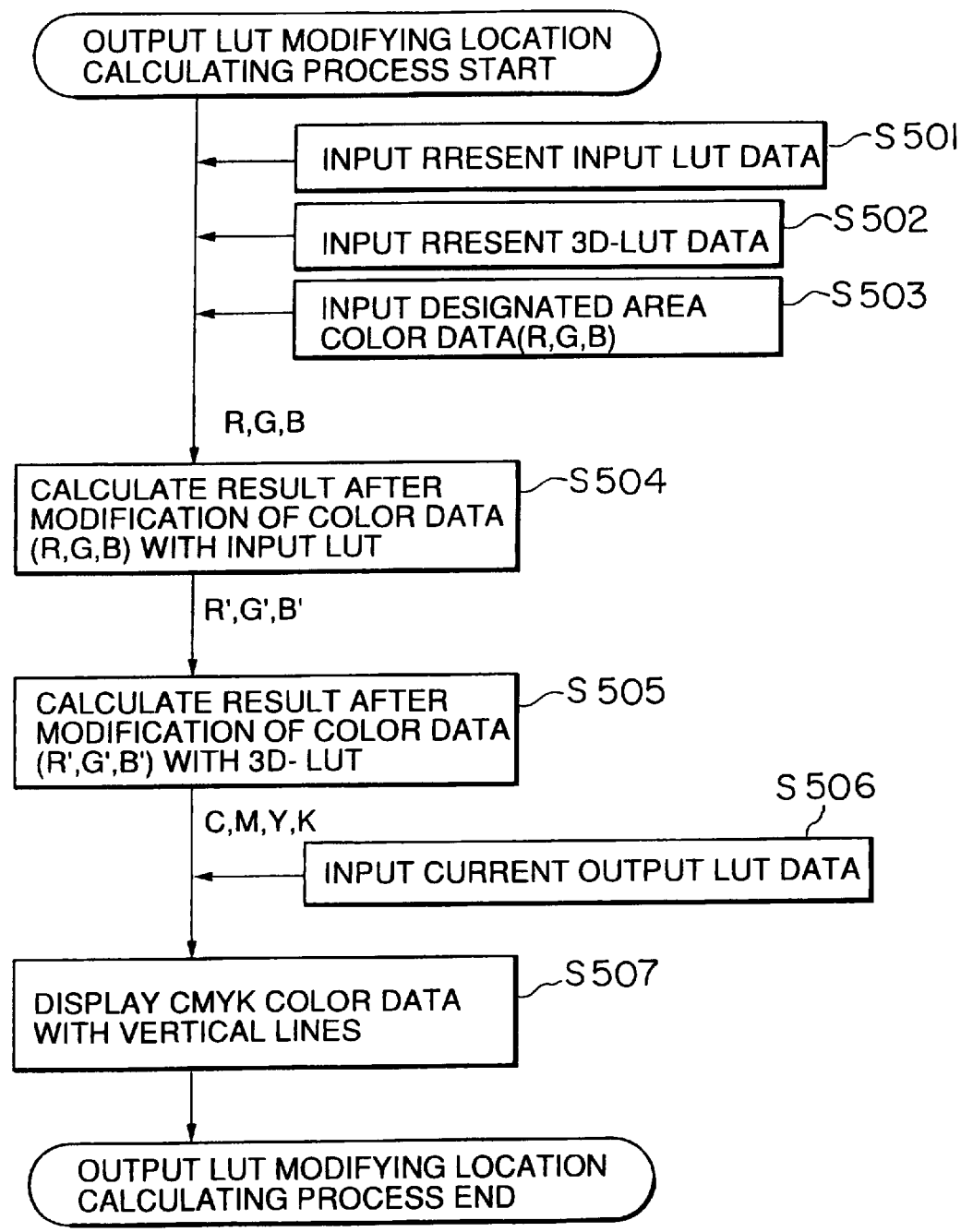
FIG. 16 is a flow chart for explaining the operation of the fifth embodiment according to the present invention.

According to a flow chart shown in FIG. 16, color signal data corresponding to the colors included in the first coloring system output from the input LUT circuits 26R, 26G and 26B are converted by the 3D-LUT circuit 27 shown in FIG. 7 with the eight-point interpolation as already described.

FIG. 7 indicates the three color signal data Cout, Mout and Yout as the output data of the 3D-LUT circuit 27 that can be employed by the fifth embodiment. However, the explanation below employs the 3D-LUT circuit 27 capable of outputting four color signals data Cout, Mout, Yout and Kout (black).

Suppose that an operator prints out color image data in RGB mode on the color printer 5 with the current 3-input LUT, 3D-LUT and 4-output. The operator examines the printed out and designates the area 16a of the color image 15a including colors he or she wants to modify on a display 14a shown in FIG. 15 of the color monitor 4.

Data indicating the designated area 16a is then supplied to a designated area color data calculator 430 via the display frame buffer 420 and the display processor 410. The calculator 430 calculates color data (RGB color data) corresponding to the colors of the designated area 16a included in the first coloring system.

With this processing, a simulator 390 accepts input LUT data from the input LUT data memory 340 (step S501) and also 3D-LUT data from the 3D-LUT data memory 350 (step S502). The accepted input LUT data and 3D-LUT data are the same as those currently set in the color printer 5.

The simulator 390 further accepts the RGB color data of the designated area 16a calculated by the designated area color data calculator 430 (step S503).

The simulator 390 then calculates color data R', G' and B' corresponding to the RGB color data of the designated area 16a that have been modified using the input LUT on the basis of the input LUT data (step S504).

The simulator 390 conducts simulation to calculate CMYK color data corresponding to colors included in the second coloring system that have been modified using the 3D-LUT by the eight-point interpolation on the basis of the color data R', G' and B' and the 3D-LUT data (step S505). The simulated results (CMYK color data) are once stored in a simulation memory 400.

Next, output LUT data the same as the output LUT data currently set in the color printer 5 are supplied from the output LUT data memory 360 to the display processor 410 (step S506). Also supplied to the display processor 410 are the CMYK color data from the simulation memory 400.

The display processor 410 executes a process for displaying vertical lines corresponding to input values of the CMYK color data and supplies display data to the color monitor 4 via the display frame buffer 420 (step S507).

With this processing, color images corresponding to the simulated color data are displayed as vertical lines I to IV on the color monitor 4 as shown in FIGS. 14A to 14D. The figures show graphs of the output LUT for the colors C, M, Y and K. Further, in each of FIGS. 14A to 14D, the input and output data under 256 degradation of the output LUT are plotted on the horizontal and vertical axes, respectively.

The values indicated by the vertical lines I to IV correspond to the input color signal data of the output LUT for obtaining the color signal data of the designated area 16a. Therefore, a point to be modified on the output LUT can be easily located.

Color adjustment will be explained next. The output LUT data stored in the output LUT data memory 360 are supplied to and adjusted by the output LUT data adjuster 330 and restored. The adjusted output LUT data are supplied to the color printer 5 via the print processor 380. The output LUT data in the color printer 5 are then rewritten with the adjusted output LUT data.

After this, the operator examines the printed out whether the designated area corresponding to the area 16a shown in FIG. 15 exhibits a desired color or not. If not, the same process will be repeated to adjust the output LUT data until the designated area exhibits the desired color.

The output LUT data only are modified during this process with no modification of the vertical lines shown in FIGS. 14A to 14D that indicate modifying locations of the output LUT data to be adjusted.

The input LUT data, 3D-LUT data and output LUT data are stored in the input LUT data memory 340, 3D-LUT data memory 350 and output LUT data memory 360. The input data and 3D-LUT data modified during the process thus can be indicated by the vertical liens.

Further, the input LUT data, 3D-LUT data and output LUT data after modification can be supplied to the color processor 7 via the CPU 6 in the color printer 5 shown in FIG. 1. The modification thus can be shown on the printed out.

When the results of the color adjustment described above is not enough, the direct mapping already described and disclosed in U.S. Pat. No. 5,264,927, for example, will be conducted by the simulator 390 for the 3D-LUT data processing.

In case of 4-input LUT and 4D-LUT, the simulator 390 will conduct eight-point interpolation under the condition that CMY color data of input CMYK color data correspond to CMY color data of output CMYK color data.

K color data corresponding to the input CMYL color data will be handled by the color printer 5 with an ULT for the K color data processing and a color conversion table indicating the color correspondence. Thus, the CMY color data will be extracted by the eight-point interpolation while the K color data will be extracted according to the color conversion table on the K color data and corresponding to the input CMYK color data.

According to the present invention, simulation is conducted such that color signals corresponding to colors included in the first coloring system and located in a designated area of a displayed image are converted into adjusted color signals corresponding to colors included in the second coloring system; and the simulated results are displayed as input data on graphs exhibiting the input and output characteristics of the output look-up table of a color printer.

Therefore, even an unskilled operator can easily determine input data indicating modifying locations on color signal adjustment to the output look-up table for color signal adjustment by modifying the output look-up table data.

Accordingly, the present invention achieves precise color modification in a short time with less repetition of modification and printing.

What is claimed is:

1. A method of color signal adjustment with supplying table data to a printer that modifies a first color signal corresponding to at least a color included in a first coloring system using first input look-up table data, converts the modified first color signal into a second color signal corresponding to at least a color included in a second coloring system using at least first color conversion look-up table data, and adjusts the second color signal so as to be printed as first image using first output look-up table data with the entered table data for printing, the method comprising the steps of;

entering second input look-up table data, second color conversion look-up table data and second output look-up table data identical to the first input look-up table data, the first color conversion look-up table data and the first output look-up table data, respectively;

calculating color data on at least an area of a second image displayed on a monitor;

simulating the calculated color data on the basis of the second input look-up table data and the second color conversion look-up table data; and generating a first displaying signal indicating the simulated color data, the first displaying signal being displayed on the monitor as at least a graph indicating input and output characteristics related to the second output look-up table, thus adjusting the first image so as to match the second image.

2. The method according to claim 1, wherein the generating step further comprising the step of generating a second displaying signal indicating the simulated color data, the second displaying signal being displayed on the monitor as a plurality of bar graphs indicating the input and output characteristics, the graphs corresponding to colors included in the second coloring system.

3. A color reproduction method of converting first color signal data of at least a first color included in a first coloring system forming an original image that has been displayed on a monitor screen into second color signal data of at least a second color included in a second coloring system, by using a first color conversion table, the second color signal data being used for printing the original image as a printed image by a printer, the method comprising the steps of:

entering a color modification parameter corresponding to a difference between the second color of the second coloring system for the printed image and the first color of the first coloring system for the original image;

reverse-converting the color modification parameter;

optimizing an amount to be modified on the first color conversion table based on the reverse-converted the color modification parameter;

optimizing the same color modification parameter but not reverse-converted;

calculating a first area to be modified and first data of an amount to be modified on the original image based on the reverse-converted color modification parameter and the original image;

forming a second color conversion table based on the first area to be modified and the first data of the amount to be modified;

calculating a second area to be modified and second data of an amount to be modified on the original image based on the color modification parameter that has been optimized but not reverse-converted and the original image;

calculating first modified image data based on the first color signal data by using the second area to be modified and the second data of the amount to be modified and an image to be modified;

converting the original image into the second color signal data by using the second color conversion table to generate second modified image data; and combining the first and second modified image data to generate the image to be modified.

4. The method according to claim 3 further comprising the steps of:

calculating a distorted amount of the second color conversion table after the amount to be modified on the first color conversion table is optimized; and judging whether the distorted amount is within a predetermined range;

wherein the first and second areas to be modified and the first and second data of the amount to be modified calculated when the distorted amount is judged to be within the predetermined range.

5. The method according to claim 3, wherein the first data of the amount to be modified is calculated as an amount of modified that varies according to a distance between a point and another point on a color space within the first area.

6. A method of converting first color signal data under $2^{n+m}$ gradations into second color signal data, the first color signal data corresponding to at least a first color included in a first coloring system, the second color signal data corresponding to at least a second color included in a second coloring system, the method comprising the steps of:

entering color mode data indicating the first coloring system and first and second look-up table data;

judging whether the color mode data is in RGB mode or not;

inverting the first look-up table data to form a first look-up table if the color mode data is judged as in the RGB mode;

rearranging the second look-up table data in reverse order to form a second look-up table if the color mode data is judged as in the RGB mode;

processing the first color signal data using the first look-up table;

converting the upper n bits of the processed first color signal data into main data of the second color signal data on the basis of the second look-up table;

outputting interpolation coefficients related to the second look-up table;

calculating interpolation data for interpolating the main data using the coefficients and the lower m bits of the first color signal data; and adding the main data and the interpolation data to output the second color signal data.

7. The method according to claim 6, wherein if the color mode data is judged as in a mode other than the RGB mode, further comprising the steps of:

forming the first look-up table using the first look-up table data without conversion; and forming the second look-up table using the second look-up table data without rearrangement.

8. A method of converting first color signal data in RGB mode under $2^{n+m}$ gradations into second color signal data, the first color signal data corresponding to at least a first color included in a first coloring system, the second color signal data corresponding to at least a second color included in a second coloring system, the method comprising the steps of:

entering color table data composed of pre-inverted first look-up table data and second look-up table data pre-rearranged in reverse order;

separating the color table data into the first look-up table data and the second look-up table data;

processing the first color signal data using the first look-up table;

converting the upper n bits of the processed first color signal data into main data of the second color signal data on the basis of the second look-up table;

outputting interpolation coefficients related to the second look-up table;

calculating interpolation data for interpolating the main data using the coefficients and the lower m bits of the first color signal data; and adding the main data and the interpolation data to output the second color signal data.

9. An apparatus for color signal adjustment with supplying table data to a printer that modifies a first color signal corresponding to at least a color included in a first coloring system using first input look-up table data, converts the modified first color signal into a second color signal corresponding to at least a color included in a second coloring system using at least first color conversion look-up table data, and adjusts the second color signal so as to be printed as first image using first output look-up table data with the entered table data for printing, the apparatus comprising;

a memory to store second input look-up table data, second color conversion look-up table data and second output look-up table data identical to the first input look-up table data, the first color conversion look-up table data and the first output look-up table data, respectively;

a calculator to calculate color data on at least an area of a second image displayed on a monitor;

a simulator to simulate the calculated color data on the basis of the second input look-up table data and the second color conversion look-up table data stored in the memory; and a generator to generate a first displaying signal indicating the simulated color data, the first displaying signal being displayed on the monitor as at least a graph indicating input and output characteristics related to the second output look-up table, thus adjusting the first image so as to match the second image.

10. The apparatus according to claim 9, the generator further generates a second displaying signal indicating the simulated color data, the second displaying signal being displayed on the monitor as a plurality of bar graphs indicating the input and output characteristics, the graphs corresponding to colors included in the second coloring system.

11. A color reproduction method of converting first color signal data of at least a first color included in a first coloring system forming an original first image that has been displayed on a monitor screen into second color signal data of at least a second color included in a second coloring system, by using a first color conversion table, the second color signal data being used for printing the original image as a printed image by a printer, the method comprising the steps of:

display a second image for modification on the monitor screen;

deciding a color modification parameter corresponding to a difference between the printed image and a third image to be printed at a desired quality by modifying the second image at a degree corresponding to the difference so that the second image is the same as the printed image in image quality; and reverse-converting the decided color modification parameter for converting the first color signal data into the second color signal data by color conversion, the second color data being printed as a fourth image that is the same as the third image in image quality.

* * * * *